United States Patent [19]

Grandemange

[11] 4,383,604
[45] May 17, 1983

[54] DEVICE FOR THE TRANSFER OF LONG PRODUCTS PARTICULARLY BARS OR TUBES

[75] Inventor: Francois G. Grandemange, Bailly, France

[73] Assignee: Vallourec, Paris, France

[21] Appl. No.: 197,702

[22] Filed: Oct. 16, 1980

[51] Int. Cl.³ ............................................. B65G 25/00
[52] U.S. Cl. .................................................... 198/775
[58] Field of Search ................ 198/773, 775, 776, 774

[56] References Cited

U.S. PATENT DOCUMENTS

| | | | |
|---|---|---|---|
| 1,375,204 | 4/1921 | Bohnenblust | 198/776 |
| 2,206,156 | 7/1940 | Bogart | 198/775 |
| 2,662,529 | 12/1953 | Keith | 198/776 |
| 2,840,090 | 6/1958 | Bradford | 198/773 |
| 3,789,976 | 2/1974 | Paul, Jr. | 198/776 |
| 4,024,946 | 5/1977 | Müller | 198/774 |

FOREIGN PATENT DOCUMENTS 566104 4/1958 Belgium ............................... 198/773

Primary Examiner—John J. Love
Assistant Examiner—Paul A. Sobel
Attorney, Agent, or Firm—Brisebois & Kruger

[57] ABSTRACT

During transfer the bars or tubes of circular section are separated from each other and displaced step by step by the device while being propelled laterally and rotated. The device comprises three sets of vertically movable stringers, each having upwardly projecting teeth preferably with plane surfaces symmetrical with respect to the vertical, the teeth being equal to each other and spaced horizontally, the teeth of the stringers of any one set also being aligned, and the sets of stringers being so arranged that a product being transferred is always supported by at least two sets of stringers.

11 Claims, 7 Drawing Figures

DEVICE FOR THE TRANSFER OF LONG PRODUCTS PARTICULARLY BARS OR TUBES

BACKGROUND OF THE INVENTION

The present invention relates to a device for the transfer of long products, particularly metal products such as bars or tubes of circular section, and in which the products in the course of transfer are separated one from the other and displaced laterally step by step all while being propelled laterally and being rotated about their axes.

As an application, but in no way limiting of such devices, one can cite for example cooling units located at the end of a hot production line for welded or rolled metal tubes or metal bars. Such devices are used to permit the products, as they are transferred, to be cooled from the temperature of the end of the last heating operation to a temperature as close as possible to the ambient temperature in order to permit further manipulation or later treatment of the products. A temperature which is too high presents an obstacle or an inconvenience. It is important in such an application to obtain even and homogeneous cooling of the products in a manner to prevent their deformation. In effect, an uneven cooling creates warping and uneven tensions and stresses causing deformation of the products which in turn cause difficulties in the good execution of manipulation or of ultimate working of the cold products and make straightening operations necessary. As another application one could cite heat treatment installations, particularly furnaces.

One knows already of transfer devices having two sets of stringers placed parallel in the direction of advance of the product, each of the stringers having on its top surface a plurality of teeth, preferably identical, and each defined by two plane surfaces symmetrical with respect to the vertical, one of the sets of stringers being fixed and the other set of stringers being carried by a mobile chassis capable of being driven in movements of vertical translation and of horizontal translation. The products are alternately supported by the fixed stringers and the mobile stringers and by each of the displacements of the mobile stringers are thus displaced along the entire length of the stringers while turning without sliding, at intervals, about their axes. Such an embodiment although currently used in practice presents various disadvantages.

Thus during the passage of the product supported by the mobile stringers over the peaks of the teeth of the fixed stringers, it is necessary, to insure that the product does not sustain damage by the crest of the peak of these teeth. It is also necessary to raise the product by lifting movement of the mobile stringers above the level of the top of the peak of the teeth of the fixed stringers, this peak being cleared by a movement of horizontal translation of the mobile stringers, during which phase, the product no longer rotates, which constitutes a disadvantage, particularly in the case of cooling units.

Furthermore, the act of imparting to the mobile stringers successive movements of vertical translation and horizontal translation requires complex and very fragile mechanisms.

Also, one should observe that all the weight of all of the products rest alternately on the fixed stringers and the mobile stringers, this necessitating for all the stringers and their chassis good characteristics of mechanical strength thus rendering the entire device heavy and complicated.

One should also observe that the amplitude of the displacement in vertical translation of the mobile stringers must be relatively significant, especially to assure the movement of the product above the top peaks of the teeth of the fixed stringers as explained above, which likewise necessitates very complex driving mechanisms. Thus the known device creates very significant forces and high inertias, requiring increasing the necessary driving forces.

SUMMARY OF THE INVENTION

The present invention proposes an embodiment of a transfer device for which, by relatively simple and inexpensive means, avoids the previously mentioned disadvantages.

The device according to the invention is characterized essentially by the fact that it comprises at least three sets of vertically movable stringers, the sets of stringers being the means by which the product is moved and always supported by at least two sets of stringers.

It should be clear that the "vertical displacement" of the stringers need not be strictly vertical, but can be a displacement along a direction slightly inclined with respect to the vertical, and parallel to the bisecting planes of adjacent teeth of the stringers, when the device is placed on an inclined support.

The stringers comprise in a known manner teeth on their top part, preferably with plane surfaces symmetrical with respect to the vertical, the teeth of the different sets of stringers being equally between each other and aligned horizontally, the teeth of the stringers of the same set also being aligned.

Each set of stringers is composed of two or more stringers depending on the length dimensions of the product to be transferred, the stringers of the same set having by preference crossbars between them which connect the stringers of a set together.

The stringers, each preferably made of cut iron plate, rest on a plurality of support mechanisms, for example four, permitting communicating to the stingers the necessary vertical movements of translation, the required movements of horizontal translation of the prior art being avoided because of the structure of the device according to the invention.

Each mechanical support advantageously has a shaft, journalled at its ends, to which are attached at least three cams each corresponding to a stringer, each of the cams advantageously comprising a circular plate of which the center is eccentric, with respect to the axis of the shaft, by an amount equal to one-half of the value of the desired vertical amplitude for the corresponding stringer. In order to obtain the synchronization of the necessary displacements the centers of the circular cam plates are located respectively in planes passing through the axis of the shaft and inclined at 360°/n, each one with respect to the others, n being the number of sets of stringers. Thus, where there are three cams fixed to the shaft, the centers of the cam plates will be 120° circumferentially from each other. Each support mechanism thus constructed can be put into rotation by a motor, preferably an electric motor, the synchronization of the rotations of the motors of the different supports being obtained in a known manner and which it is not necessary to describe here. The stringers can also be guided at their lower portion by means of vertical slides connected to the stringers and sliding in vertical guides attached to the floor or ground.

Other advantages and characteristics of the invention and its operation will appear from the following description of one embodiment referring to the attached drawings.

DETAILED DESCRIPTION OF PREFERRED EMBODIMENT

Figure 1:
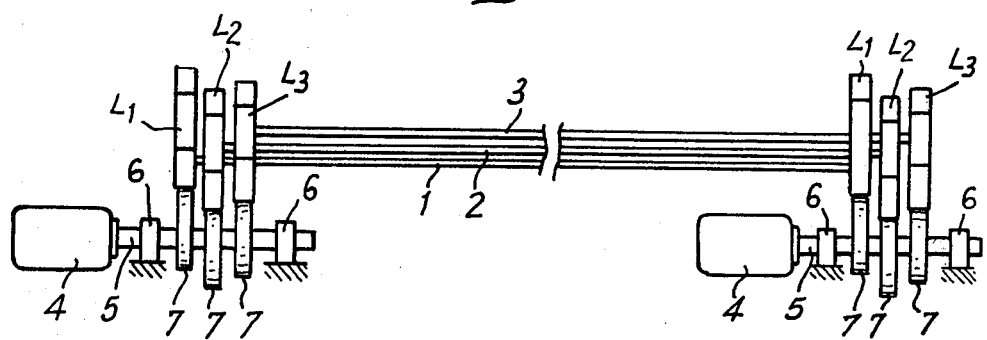
FIG. 1 shows schematically an end view of a device according to the invention.

Referring to the drawings it will be seen that the device according to the invention comprises three sets of two stringers L1, L2, L3, the stringers of each set being interconnected by crossbars 1, 2, 3.

Figure 2:
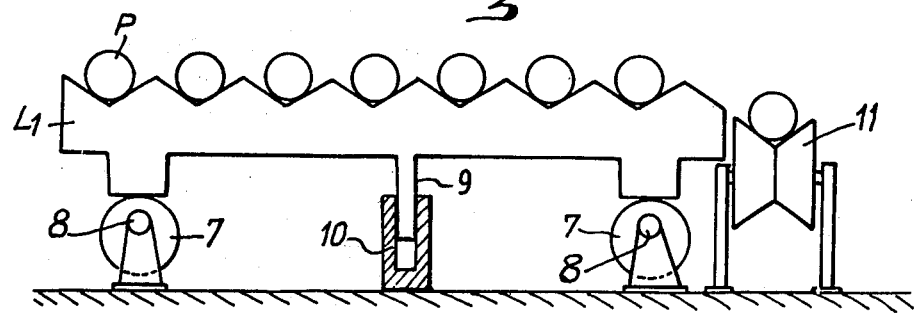
FIG. 2 shows schematically this device in side elevation.

As is shown on FIG. 2, each of the stringers comprises a flat iron plate having on its upper portion teeth with sloping plane surfaces symmetrical with respect to the vertical, the teeth being equal to each other and aligned horizontally, the teeth of any one set of stringers being aligned, preferably perpendicular to the direction of advance of products, such as tubes or bars of circular section, as indicated by P on the drawings.

The sets of stringers are supported by support mechanisms each having a motor 4, preferably electric, whose output shaft 5 journalled in bearings 6, has fixed thereto three identical cams 7 each engaged with one of the stringers.

As may best be seen on FIG. 2, each cam comprises a circular plate whose center is eccentric with respect to the axis 8 of rotation of output shaft 5 of the motor, the extent of the eccentricity being equal to one-half the value of the desired vertical amplitude of displacement of the corresponding stringer.

The different motors 4 are synchronized to yield the desired vertical displacements for the stringers. In order to insure contact without sliding between each of the cams and the corresponding stringer, the cams are advantageously furnished at their periphery with roller bearings or roller followers are provided on the stringers (neither shown). Also, to avoid any lateral movement of the sets of stringers, they are supplied with guiding plates (not shown) flanking the side faces of the cams, or the rings of the roller bearings, when used.

In order to insure vertical guiding of the stringers they are advantageously furnished at their lower portion with slides 9 slidable in vertical guides 10 fixed to the floor or base on which the device is mounted.

The loading or feeding of the products onto the device, as well as their unloading, may be carried out by any known appropriate means, particularly raising and lowering wheels indicated by 11 on FIG. 2 for the removal of products.

In one embodiment of the invention, for products to be treated having a maximum diameter of 200 mm, the teeth faces of the stringers are inclined at 30° with respect to the horizontal, that is, faces of adjacent teeth are 120° open toward the top, and a pitch of teeth of 300 mm. The vertical amplitude of the stringers is 77 mm, while in a conventional installation having a set of fixed stringers and a set of mobile stringers with an equal pitch, the vertical amplitude would have to be about 145 mm to which would have to be added a horizontal translation amplitude of about 100 mm, or at least a vertical amplitude of 87 mm combined with a horizontal amplitude of 300 mm.

According to the invention, after having traversed a distance of translation in the direction of the advance of 300 mm, the product will have accomplished 0.55 revolution about its axis while in a conventional installation this rotation will be at maximum equal to 0.37 revolution and might be less or nothing.

Refer now particularly to FIGS. 3a to 3e, which schematically show the displacement of a product P during displacements of vertical translation of stringers L1, L2, L3. In view of the uniquely vertical displacements of these stringers, the peaks of the teeth of the different stringers each move along a different vertical plane perpendicular to the direction of movement of the product. The different vertical planes are equidistant from each other, and correspondingly where there are three stringers (L1, L2, L3) each with teeth of the same pitch S, the horizontal distance between the vertical planes in which the peaks of the teeth of the respective stringers move is S/3, the general expression being S/n, where n is the number of stringers, but n is at least 3 in this invention. As previously mentioned, where there are three cams and three stringers, the cams are 120° out of phase with each other on shaft 5. However, in order to cause movement of the product P to the right, as shown in the sequence of FIGS. 3a–3e, and where the peaks of the stringer teeth are in the sequence L1, L2, L3, the shaft 5 must be rotated in the proper direction to cause the stringers to move vertically in the same sequence L1, L2, L3.

Figure 3A:
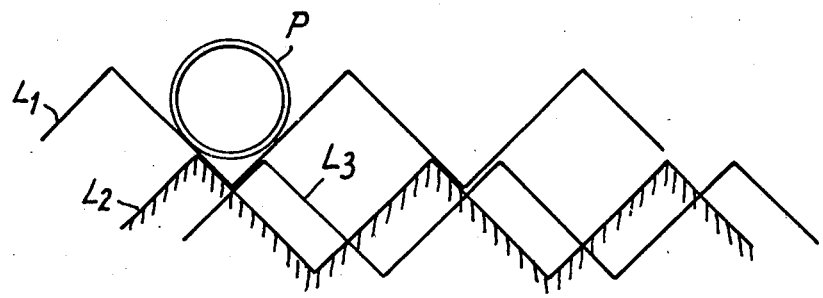
FIGS. 3a to 3e illustrate the operation and motion sequence of the device during the transfer of a product.

FIG. 3a shows a position of the stringers in which L1 is at its maximum height, i.e. is on the high point of its cam, and shaft 5 is rotated in a direction such that L2 is moving upwardly and its cam trails the cam of L1 by 120°, and L3 is moving downwardly and its cam leads the cam of L1 by 120°. In this position the product P is in contact with the three stringers, L1, L2, L3.

Figure 3B:
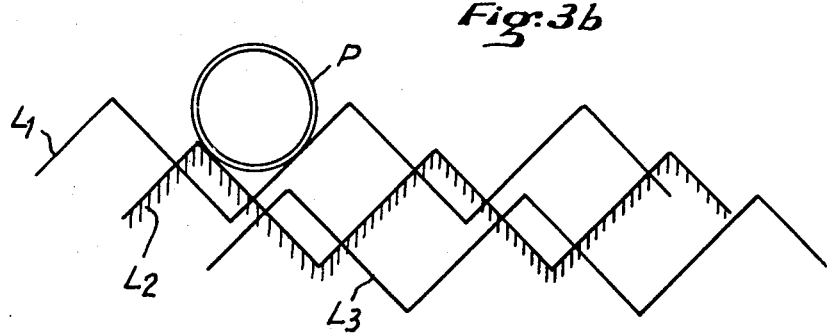

The sets of stringers L1 and L3 then lower and stringers L2 are raised, the product P then being found in the position of FIG. 3b resting on stringers L1 and L2, a position to which and in which the product rolls without sliding on the tooth flanks, while also being displaced forwardly, i.e. to the right in FIGS. 2 and 3.

Figure 3C:
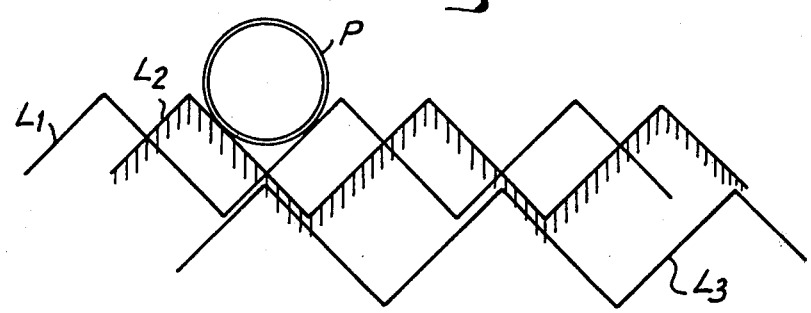
Figure 3D:
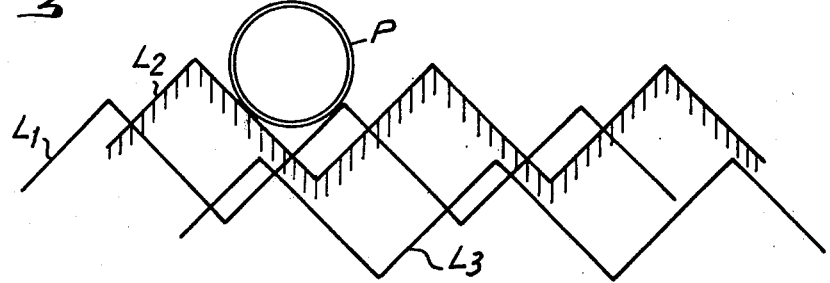

FIG. 3c shows an intermediate position (60° of shaft rotation from the position of FIG. 3a) in which stringers L1 and L2 are at the same level, stringers L3 having attained their lowest level. It will be noted that in this position, regardless of the diameter of the product P and particularly how small it is, the peaks of the teeth of stringers L3 are located beneath the lowest point of the product, that is, there is no possible interference between the peaks of the teeth of the third set of stringers L3 and the products being transferred.

Starting from the position shown on FIG. 3c, the set of stringers L3 move back up, as do stringers L2 while stringers L1 continue to descend. The product continues to move in rotation and translation on stringers L1 and L2 as shown in the intermediate position on FIG. 3d.

Figure 3E:
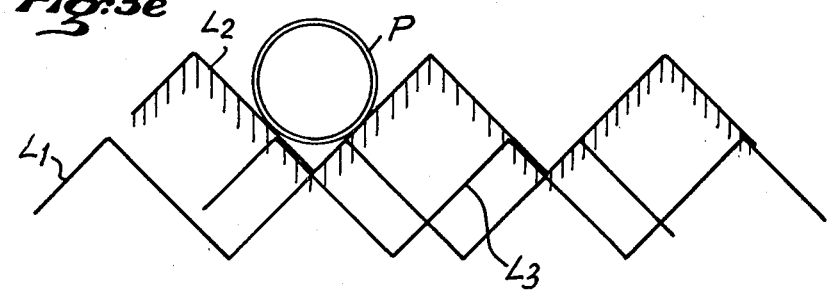

Then, the position of FIG. 3e is reached (120° shaft rotation from the position of FIG. 3a) in which the product rests on stringers L1, L2, L3, and stringer L2 is at its maximum height. After another 120° rotation of shaft 5 (one complete revolution from the FIG. 3a position), stringer L1 is again at its maximum height, as shown at FIG. 3a, but product P has moved to the right a distance S equal to the pitch of the stringer teeth.

It is also possible, according to the invention, to periodically reverse the sequence of the movements of the stringers with respect to each other (periodically reverse the direction of rotation of shaft 5), which allows a backward and forward movement of the product so as to allow each tube to turn about itself (no new products being put in place, if the introduction tooth already carries a product), and without unloading the products located near the discharge end of the device. In this way the device can be used to store tubes temporarily while the tubes continue to roll about themselves.

Although the invention has been described in connection with one particular embodiment, it is of course in no way thereby limited and may undergo numerous modifications without exceeding either its scope or its spirit.

What is claimed is:

1. A device for horizontally transferring long and heavy articles, particularly metal articles such as bars or tubes of circular section, in which the articles in the course of transfer are laterally spaced from each other and displaced laterally while rotating about themselves, said device comprising at least three sets of stringers, each set of stringers comprising at least two laterally spaced-apart stringers, each stringer having upwardly projecting teeth presenting surfaces symmetrical with respect to a vertical plane generally perpendicular to the travel path of the article, the teeth being equal to each other and spaced apart respectively horizontally, the teeth of the stringers of each set being aligned transversely of the direction of travel of the article, and the peaks of the teeth of the respective sets being spaced from each other in a direction parallel to the path of travel of the articles, and drive means for moving the stringers vertically in sequence to rotate and laterally displace an article thereon, said drive means comprising means for moving each peak of a tooth of each of the stringers exclusively in a vertical plane generally perpendicular to the travel path of the product, said drive means and said teeth of said stringers cooperating to comprise means for always supporting the article on teeth of at least two sets of stringers during lateral displacement of the article.

2. A device according to claim 1, wherein the stringers of each set are interconnected by crossbars.

3. A device according to claim 2, wherein each stringer comprises a cut flat iron plate.

4. A device according to claim 1, wherein the vertical planes of the peaks of the teeth of the respective sets of stringers are equally spaced apart.

5. A device according to claim 1, wherein said drive means comprises motor driven support mechanisms supporting said stringers, and comprising a motor having a shaft journalled at its ends, and at least three cams fixed to said shaft, said cams supporting the respective stringers.

6. A device according to claim 5, wherein each of the cams comprises a circular plate whose center is eccentric with respect to the axis of the shaft by one-half the value of the desired vertical amplitude for the corresponding stringer.

7. A device according to claim 6, wherein the centers of the cam plates are situated respectively in planes lying in the axis of the shaft and inclined at 360°/n, with respect to each other, n being the number of sets of stringers.

8. A device according to claim 1, wherein the stringers are guided at their lower portion by means of vertical slides connected to the stringers and sliding in vertical guides fixed to a base.

9. Means for cooling metallurgical products such as bars and tubes of circular section comprising the device claimed in claim 1.

10. A device according to claim 7, wherein said motor comprises means for rotating said cams in either direction to cause a product on said stringers to move toward and away from a selected end of the device.

11. A device according to claims 2, 5, 7, or 1 wherein the teeth of at least three sets of stringers each have a pitch S, and the peaks of the teeth of the respective stringers are spaced apart in a direction parallel to the travel direction of the article by a distance S/n, where n is the number of sets of stringers.

* * * * *